Feb. 17, 1953 W. H. BURLEYSON 2,629,042
PORTABLE FOOD CONTAINER HAVING
AN ELECTRIC HEATING ELEMENT
Filed Dec. 29, 1949 2 SHEETS—SHEET 2
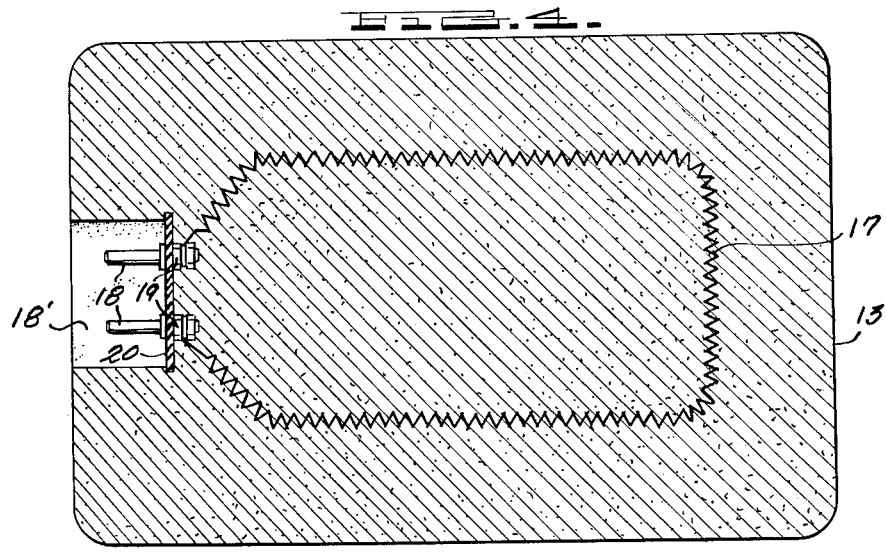
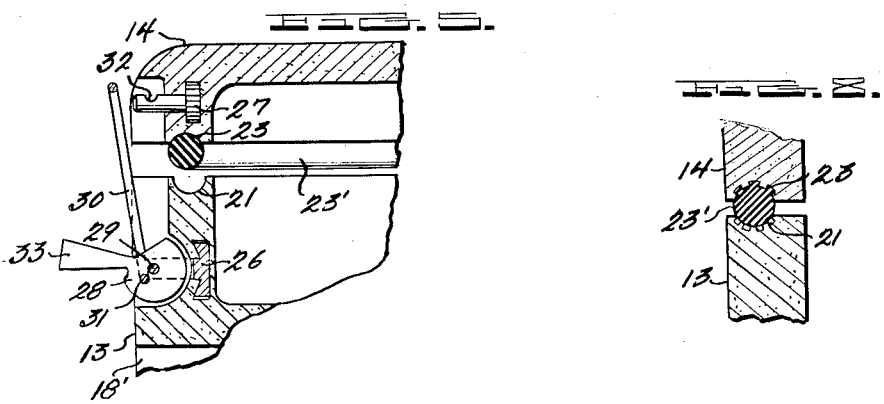
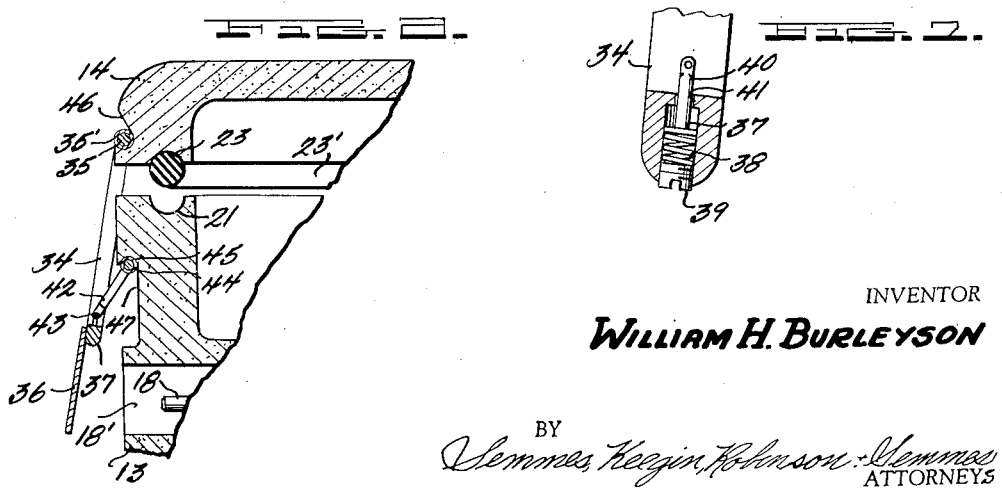
INVENTOR
WILLIAM H. BURLEYSON
BY
Semmes, Keegin, Johnson & Semmes
ATTORNEYS Patented Feb. 17, 1953

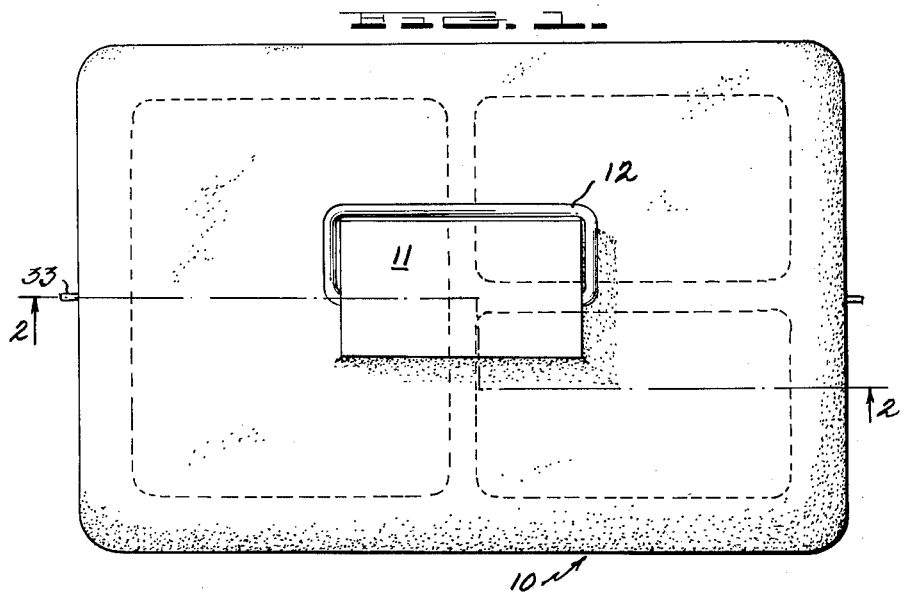
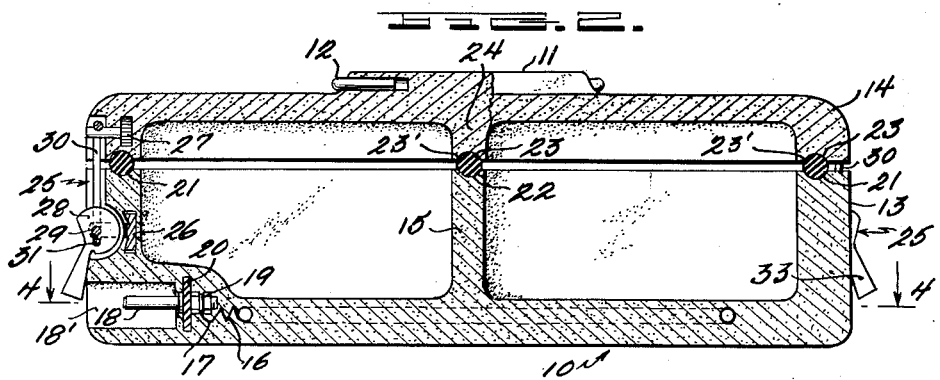
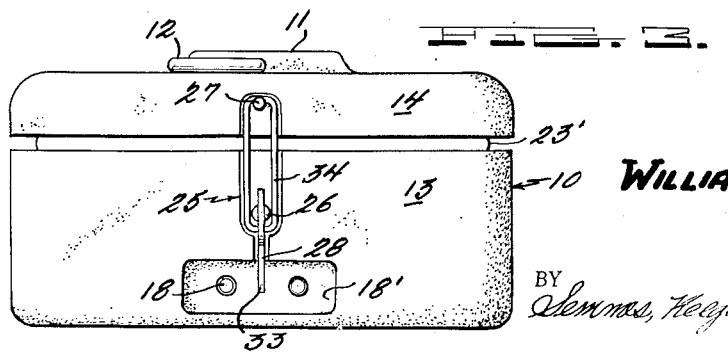

2,629,042

UNITED STATES PATENT OFFICE 2,629,042

PORTABLE FOOD CONTAINER HAVING AN ELECTRIC HEATING ELEMENT

William H. Burleyson, Baltimore, Md.

Application December 29, 1949, Serial No. 135,808

2 Claims. (Cl. 219—44)

This invention relates to containers and has specific reference to a portable container for carrying food which has a heating element formed as a part of said container for heating the contents thereof.

At the present day there are millions of industrial and office workers who require or at least are desirous of hot food at lunch time. Either because of the inaccessability of restaurants and cafeterias or because of the high prices, these people are unable to get the kind of meal that they want. Furthermore, due to stomach conditions, diets, etc., many people cannot eat sandwiches and other foods which are normally carried in lunch boxes.

It is therefore a primary object of the present invention to provide a container for food which is portable and which at the same time includes electrical means for heating the food wherever an electric current can be supplied.

Another object of this invention is to provide a container for carrying food having a lid which can be closed to form a liquid seal and having an electric heating element embodied therein for heating the food wherever an electric current can be supplied.

Still another object of this invention is to provide a container for carrying food which has several compartments sealed from one another when the lid is closed and having an electric element embodied therein for heating the food carried thereby.

Yet another object of this invention is to provide a container of the character described which is made of ceramic or other suitable material and which has an electric heating coil which is embedded in the body of the container at the time of casting with means for connection with an electric circuit.

A further object of this invention is to provide a container of the character described which is small enough to be carried in a pocket, lady's handbag or a lunch box.

A still further object of this invention is to provide a container of the character described which is unitary in construction and which is easy to manufacture in quantity.

With the above objects and advantages in view, which will become more apparent during the course of the following description, the invention consists in the features and combinations hereinafter set forth with the understanding that various changes may be made therein, such as the size, shape, and arrangement of features or by the substitution of equivalents without departing from the spirit of the invention.

In order to make the invention more clearly understood, preferred embodiments thereof have been made the subject of illustration in the accompany drawings in which:

Figure 1 is a top view of the container of this invention showing the position of the interior compartments in dotted lines;

Figure 2 is a transverse view of the container taken along the lines 2—2 of Figure 1;

Figure 3 is an end view of the container showing the electrical connection prongs and the fastener mechanism;

Figure 4 is a horizontal cross-sectional view of the container taken along the lines 4—4 of Figure 2 and showing the heating element embedded in the base of the container;

Figure 5 is a fragmentary transverse view of the container showing the fastening and sealing means in detail;

Figure 6 is a fragmentary transverse view of the container showing a modified fastening mechanism;

Figure 7 shows how the fastening mechanism of Figure 6 may be adjusted to insure a tight closing of the container; and Figure 8 shows another means for forming a seal for the container.

In its broadest concept, the present invention comprises a container of ceramic or other suitable material including a body portion with an electric heating element formed as an integral part thereof. It is preferred that a Nichrome or resistance wire be installed in the ceramic container at the time of its casting with electric connection prongs extending therefrom. An electric cord is provided for connecting the heating element into any convenient electrical outlet. The container is further provided with a lid having means cooperable with an upper rim of the container body to create a liquid seal between the interior of the container and the atmosphere when closed. The lid is preferably held in the closed position by a cam fastener on one end thereof and another cam fastener on the other end.

In addition, it is contemplated that the interior of the container be divided into compartments having means cooperable with the lid for sealing the compartments from each other. A handle may also be attached for carrying the container.

Referring particularly to the drawings, Figure 1 shows a container 10 made of ceramic or other suitable material. This container is preferably cast in a mold and has rounded corners so that it may be easily carried. A slightly projecting section 11 is formed on the top of the container and a handle 12 is attached to this projection. When the handle is folded down, the projection protects it and prevents its flapping around. The outline of several compartments for separating different foods to be carried by the container is shown by the dotted lines.

Figure 2 shows the container and its various parts in considerable detail. The container is shown to generally comprise a body portion 13 and a lid 14. A compartment partition wall 15 is as high as the side walls of the body portion. A heating element 16 is positioned in the base of the body portion. This element is preferably installed at the time that the container is cast in a mold. As shown in Figures 2 and 4, this heating element comprises a coil of Nichrome or other resistance wire 17 fixed to a pair of connection prongs 18 by nuts 19. A fiber insulator 20 helps to anchor the heating element within the base of the container. The prongs are protected in a recess 18' at one end of the body portion of the container. An ordinary electric cord, not shown, is connected to these prongs at one end and plugged into any convenient outlet at the other end to heat the contents of the container.

A continuous groove runs around the top rim of the body portion as shown at 21. A similar groove is centered along the edge of all the partition walls as shown at 22. The lid of the container has a continuous groove 23 around the underside edge thereof. The lid also has short partition members to oppose the partition walls of the body portion, one of which is shown at 24. This partition member has a groove centered in its lower edge also. A gasket 23' such as a cylindrical rubber strip is vulcanized into the continuous groove of the lid and secured in place. This gasket is secured into the partition member grooves also.

Since the grooves in the body portion and the lid are directly opposed to each other when the lid is closed, the gasket fits snugly into the grooves of the body portion to form a seal. The gasket has a larger circumference than the groove in the body portion so that the gasket will always more than fill the groove. In this manner, a leak proof seal is always assured.

This sealing effect may be enhanced further by casting longitudinal channels in the grooves as shown in Figure 8. The gasket will then be secured more firmly in the grooves of the lid and the sharp edges of the channels in the grooves of the body portion will bite into the gasket to make a better seal when the lid is closed.

To hold the lid firmly closed and maintain the leak proof seal which is so important, a unique fastening means has been incorporated. Preferably as shown in Figures 2, 3 and 5, a cam operated fastener 25 is recessed in the container at opposite ends thereof, one being over the recess 18'. To make up the fastener, a headed pin 26 is set in the body portion, and a similar pin 27 is set in the lid of the container. A cam 28 is pivoted at 29 to the end of the pin 26, and a connecting arm or bracket 30 is pivoted at 31 eccentrically of the cam. The upper end of the connecting arm swings over the end of the pin 27 and lodges in a notch 32 toward the end of said pin. The connecting arm swings free when the fastener is loosened.

A finger tab 33 on the cam extends downward when the fastener is closed so as to partially cover the electrical connection prongs. This not only protects the prongs, but adds a safety factor by preventing the supplying of heat to the container when it is sealed.

Figures 6 and 7 show a pull-down clamp as a modified form of fastening means for the container of this invention. A handle bar 34 has at its top end a horizontal bearing arm 35 surrounded by a sleeve 35' and a handle extension 36 at its lower end. A spring recess is set in the handle at 37. A spring 38 is positioned in the recess and an adjustment screw 39 closes the base of this recess to enable proper adjusting of the tension exerted by the spring. A plunger pin 40 passes out of the spring recess through an opening 41. A lower arm 42 is pivoted to the plunger pin at 43. This lower arm has a horizontal bearing arm 44 at its upper end with a sleeve 45 surrounding it. In order to receive the horizontal bearing arms, anchor slots are cast directly into the body portion and the lid of the container. An upper slot 46 receives bearing arm 35 and a lower slot 47 receives bearing arm 44 when the lid is to be closed. This form of fastener guards against leakage of the contents from the container and at the same time yields to internal pressure by virtue of the spring action.

It should be noted that when the lid is closed over the body portion of the container the lid never touches the body portion. By having the gasket as large as it is, even with the firm clamping means provided, there is always a small space between the lid and body portion when the container is closed. Thus, a tight seal is always achieved, because as the gasket wears, the lid and body portion come closer together. In this same manner, the several compartments within the container are sealed from one another.

A convenient size for the container of this invention is six inches long, three inches wide and two inches deep. Due to the leakproof qualities of the container, the container may be carried in a lunchbox, lady's handbag, or a large pocket even when liquids are contained therein. Also liquids and solids may be carried in the separate compartments without running together no matter how much the container is jostled.

It is apparent, therefore, that the container of this invention will enable anyone to provide hot meals for himself by a very simple means. Food, including soup, meat and vegetables may be packed in the container and the container carried to work. At meal time the lid is removed and the electric heating element is connected to an electric outlet through an electric cord. As soon as the food is hot, it can be eaten out of the container or removed and put on a plate. Of course, food may be carried separately and placed in the container only at the time it is to be heated, but it is simpler to carry everything in one compact container.

The invention is not limited to the form or uses shown, except to the extent indicated in the appended claims, which are to be interpreted as broadly as the state of the art will permit.

I claim:

1. A container for transporting food and for heating same, comprising a body portion having interior food receiving cavities and having two external recesses in one of the body sides, a lid for the body portion, an electric heating element sealed within a wall of said body portion and connected to electrical connecting members seated and exposed within one of said external recesses of the body portion, an adjustable fastener operable to secure the lid on and release the lid from the body portion, said fastener having a part seated in the other exterior recess of the body portion and having an operating finger tab so positioned as to partially cover and block access into the said exterior recess of the body member in which the electrical connecting members are exposed when the fastener is in lid securing adjustment, and to unblock said last mentioned recess when the fastener is in lid releasing adjustment.

2. A container for transporting food and for heating same as set forth in claim 1, and in which the exterior body portion recess seating the fastener part is immediately above the exterior body part recess seating the electrical connecting members, and said fastener including a cam swingably supported in the fastener part recess and the said operating finger tab being carried by and swingable with said cam.

WILLIAM H. BURLEYSON.

REFERENCES CITED

The following references are of record in the file of this patent:

UNITED STATES PATENTS

| Number | Name | Date |
|---|---|---|
| 835,841 | Vogel | Nov. 13, 1906 |
| 1,046,888 | Stanley | Dec. 10, 1912 |
| 1,257,599 | Hadaway, Jr. | Feb. 26, 1918 |
| 1,385,829 | Holbrook | July 26, 1921 |
| 1,493,925 | Charme | May 13, 1924 |
| 1,676,677 | Axelrod | July 10, 1928 |
| 1,831,663 | Hill | Nov. 10, 1931 |
| 1,895,212 | Smith | Jan. 24, 1933 |
| 1,979,222 | Goodwin | Oct. 30, 1934 |
| 2,097,186 | Hinnenkamp | Oct. 26, 1937 |
| 2,187,196 | Douglass | Jan. 16, 1940 |
| 2,189,127 | Brannon | Feb. 6, 1940 |
| 2,431,998 | Ely | Dec. 2, 1947 |

FOREIGN PATENTS

| Number | Country | Date |
|---|---|---|
| 424,981 | Great Britain | Mar. 5, 1935 |
| 497,920 | Germany | May 16, 1930 |